United States Patent Office 2,966,475
Patented Dec. 27, 1960

2,966,475

ADHESIVE COMPRISING POLYVINYL BUTYRAL RESIN, CHROMATE SALT, AND COPPER SALT

Catharinus Jacobus van Putten and Theo Tjalke Boersma, Eindhoven, Netherlands, assignors to North American Philips Company, Inc., New York, N.Y., a corporation of Delaware No Drawing. Filed Apr. 15, 1957, Ser. No. 652,664

Claims priority, application Netherlands May 16, 1956

3 Claims. (Cl. 260—38)

The invention relates to the composition of an adhesive containing polyvinylbutyral, a thermo-hardening adhesive consisting mainly of a phenol aldehyde condensate with which an adhesive containing polyvinylbutyral is mixed, a cement obtained by mixing the last-mentioned thermo-hardening adhesive with filling means and to objects secured to one another by means of the adhesives according to the invention.

The term polyvinylbutyral is to be understood to mean herein polyvinylalcohol, of which a large part of the hydroxyl groups, usually 50 to 90% thereof, is condensed with butylaldehyde.

In accordance with the invention an improvement of the resistance to moisture and salts is obtained by combining polyvinylbutyral with ammonium chromate and/or ammonium bichromate for the hardening process and with a copper salt for activating the hardening reaction. The quantities of ammonium chromate and/or ammonium bichromate may be 5 to 60% of the weight of the polyvinylbutyral used. The copper salt may be for example copper sulphate, copper chloride or copper nitrate. Suitable quantities thereof are 1 to 6% by weight of polyvinylbutyral.

Since polyvinylbutyral itself is not suitable for many high-quality adhesives for glass, metal, phenolaldehyde condensates owing to an insufficient resistance to heat, use is preferably made of mixtures of polyvinylbutyral with other adhesives. With a preferred embodiment of the invention a thermo-hardening adhesive is composed mainly of a hardenable phenolaldehyde condensate mixed with an adhesive consisting of polyvinylbutyral, ammonium bichromate and a copper salt.

Thermo-hardening phenolaldehyde condensates may be used as adhesives to obtain a strong joint, which, however, is rather brittle and which therefore cracks readily in the case of different expansion coefficients of the joined parts.

By combining the thermo-hardening condensate of phenol and aldehyde with polyvinylbutyral, the brittleness of the joint is reduced; this, however, is attended with an increase in sensitivity to moisture. In order to mitigate the latter disadvantage, ammonium chromate and/or ammonium bichromate and a copper salt are introduced into the adhesive, in accordance with the invention.

The phenolaldehyde condensate may be a condensate of phenol, cresol, xylenol or resorcinol with an aldehyde, for example, formaldehyde, acetaldehyde and butylaldehyde. Both one-stage condensates and two-stage-condensates may be used. One-stage condensate may for example be made by causing phenol to react with a more than equimolecular quantity of formaldehyde and stopping the condensation reaction before the condensate gets hardened. A two-stage condensate may be made by first causing phenol to condense with an aldehyde in a less than equimolecular proportion and in a later stage adding to the novolak thus formed a substance that on heating splits off an aldehyde such as paraformaldehyde or hexamethylene tetramine.

The hardening takes place mostly at 120 to 250° C. Use is often made of a pressure of 1 to 10 atmospheres.

The adhesive may contain, apart from solvents such as ethyl alcohol, colouring substances, filling material and the like.

As a cement the adhesive, in accordance with this preferred embodiment of the invention, may be used after being mixed with a 10- to 20-times larger quantity of inorganic filling means, for example, lithopone and marble powder. Such a cement is very suitable for fastening a cap composed of a thermo-hardened phenolaldehyde condensate to the glass bulb of an incandescent lamp or a fluorescent lamp.

Hereinafter a few experiments will be described, which have led to the invention.

I. Strips of 14 mms. in width of a thermo-hardened phenolaldehyde codensate are joined over a length of 15 mms. by means of an adhesive consisting of polyvinylbutyral mixed with 10% ammonium bichromate and 2% of copper sulphate.

After the adhesive has been hardened at room temperature and been exposed to an atmosphere of variable humidity for four weeks, a shearing force of 27 kgs. was required to break the joint.

A corresponding joint obtained by means of a copper-free adhesive required a shearing force of 20 to 22 kgs. If also ammonium bichromate was omitted, a resistance to shear of 11 to 12 kgs. was found.

II. An adhesive was prepared by mixing 50 gs. of a cresol formaldehyde novolak with 7 gs. of hexamethylene tetramine, 2 gs. of polyvinylbutyral (74% of the hydroxyl-groups are blocked), 1 g. of ammonium chromate and 0.2 g. of copper sulphate.

This mixture was stirred with ethyl alcohol and applied to a lamp cap, composed of thermo-hardened phenolaldehyde condensate and then the alcohol is caused to evaporate. Then the glass bulb of an incandescent lamp is pressed against the cap and the unit is heated to 220° C. After 30 seconds the lamp is caused to cool slowly.

After these lamps had been immerged in a 5% salt solution at 40° C. for three days, the joint could be broken by torsional forces of 60, 48 and 56 kgs./cm.

By way of comparison it should be noted that a corresponding experiment was made with a copper-free adhesive, with which the joint was broken by torsional forces of 30, 22 and 20 kgs./cm.

What is claimed is:

1. An adhesive, particularly adapted for fastening thermo-hardened phenol aldehyde condensate articles, comprising a mixture of a polyvinylbutyral resin from about 5% to 60% based on the weight of the polyvinyl butyral of at least one ammonium salt selected from the group consisting of ammonium chromate and ammonium bichromate and from about 1% to 6% based on the weight of the polyvinyl butyral of a copper salt selected from the group consisting of copper sulphate, copper chloride and copper nitrate.

2. An adhesive particularly adapted for fastening thermo-hardened phenol aldehyde condensate articles, comprising a mixture of a polyvinyl butyral resin, a heat hardenable phenol aldehyde condensate, from about 5% to 60%, based on the weight of the polyvinyl butyral of at least one ammonium salt selected from the groups consisting of ammonium chromate and ammonium bichromate and from about 1% to 6%, based on the weight of the polyvinyl butyral, of a copper salt selected from the group consisting of copper sulphate, copper chloride and copper nitrate.

3. A joining composition comprising a mixture of one part of the adhesive of claim 2 and from about 10 to 20 parts of an inert inorganic filling agent.

References Cited in the file of this patent

UNITED STATES PATENTS

| | | |
|---|---|---|
| 1,726,151 | Hole | Aug. 27, 1929 |
| 1,767,421 | Wirth | June 24, 1930 |
| 2,253,235 | Hampel | Aug. 19, 1941 |
| 2,396,098 | Haas | Mar. 5, 1946 |
| 2,410,414 | Johnson | Nov. 5, 1946 |
| 2,411,878 | Hershberger | Dec. 3, 1946 |
| 2,579,610 | Pitre | Dec. 25, 1951 |
| 2,592,655 | Carlston et al. | Apr. 15, 1952 |
| 2,612,481 | Cone | Sept. 30, 1952 |
| 2,639,258 | Evans et al. | May 19, 1953 |

OTHER REFERENCES

Del Monte: Technology of Adhesives, Reinhold Pub. Corp., New York, New York, 1947, pages 130–135 and 482.